United States Patent [19]

Ferris et al.

[11] Patent Number: 4,570,816
[45] Date of Patent: Feb. 18, 1986

[54] HATCH COVER AND LOCKING STRUCTURE

[75] Inventors: Ray L. Ferris, Thornton; Donald B. Yates, Homewood, both of Ill.

[73] Assignee: Pullman Standard, Inc., Chicago, Ill.

[21] Appl. No.: 659,559

[22] Filed: Oct. 10, 1984

[51] Int. Cl.⁴ .................... B65D 45/24; B65D 45/28; B61D 17/12; B61D 39/00
[52] U.S. Cl. ................ 220/314; 105/308 E; 105/377; 114/230; 220/324
[58] Field of Search ............... 220/314, 324; 105/308 E, 377; 114/230

[56] References Cited

U.S. PATENT DOCUMENTS

| | | | |
|---|---|---|---|
| 1,739,911 | 12/1929 | McMurray | 220/314 |
| 1,929,761 | 10/1933 | Thwaits | 220/314 |
| 2,324,356 | 7/1943 | Brown | 220/314 |
| 4,046,082 | 9/1977 | Tedesco | 105/377 |
| 4,331,257 | 5/1982 | Taschner | 220/324 |
| 4,388,873 | 6/1983 | Carleton | 220/314 |
| 4,441,431 | 4/1984 | Carney | 220/314 |

FOREIGN PATENT DOCUMENTS 949005   6/1974   Canada ........................... 220/314

Primary Examiner—George E. Lowrance
Attorney, Agent, or Firm—Richard J. Myers & Assoc., Ltd.

[57] ABSTRACT

The hatch of a lading container, such as the hopper of a covered hopper car, is sealed by a hatch cover having a locking arrangement which prevents the hatch cover from being blown open by pressure within the hopper when the locking arrangement is unlocked. An over-center locking arm has two spaced catches which co-act with two latches on a latching arrangement to selectively provide a sealed, a pressure blow-off, and a hatch open position. A rotative adjustment is provided to enable adjustment of the sealing pressure of the hatch cover on the hatch.

18 Claims, 5 Drawing Figures

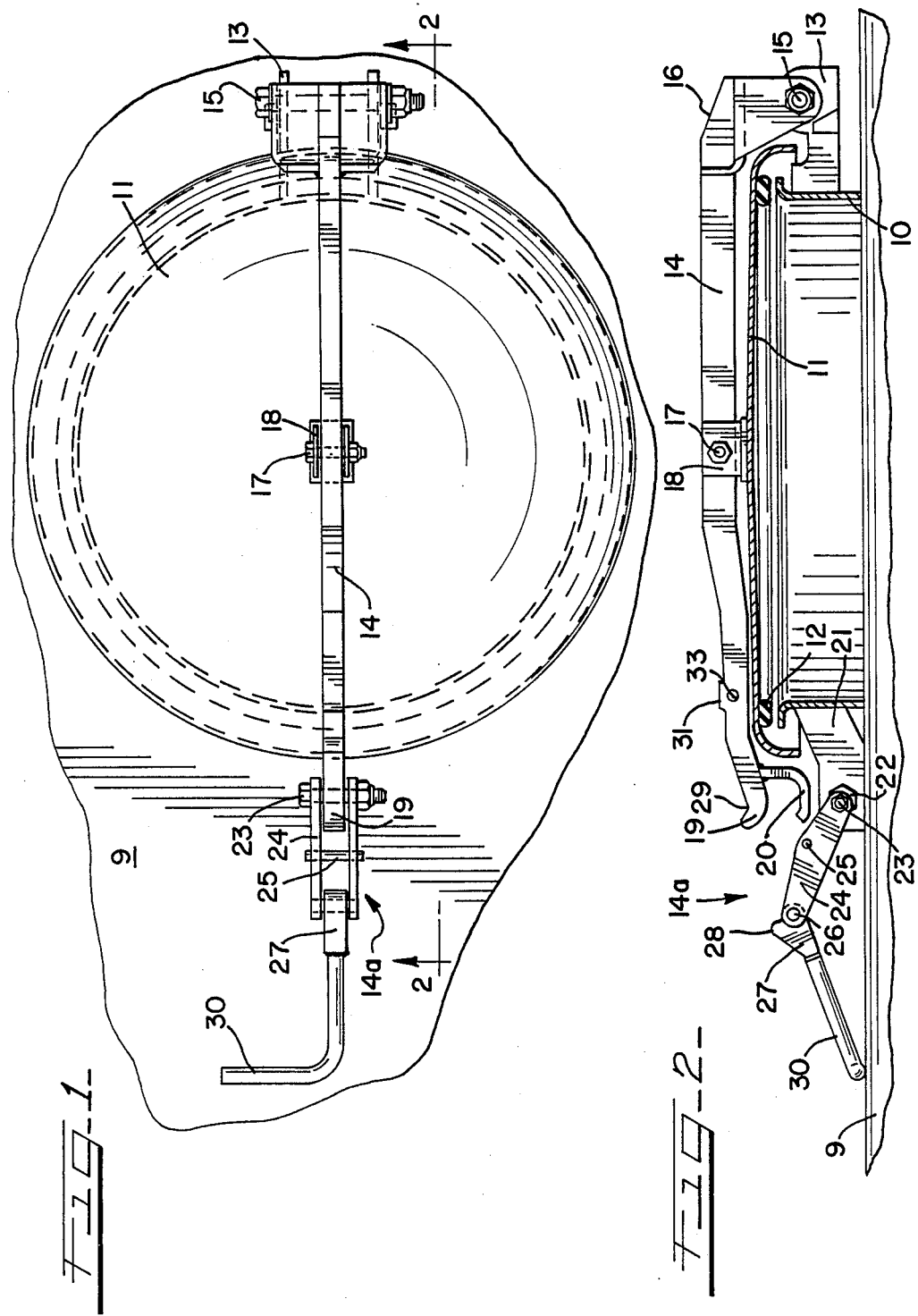

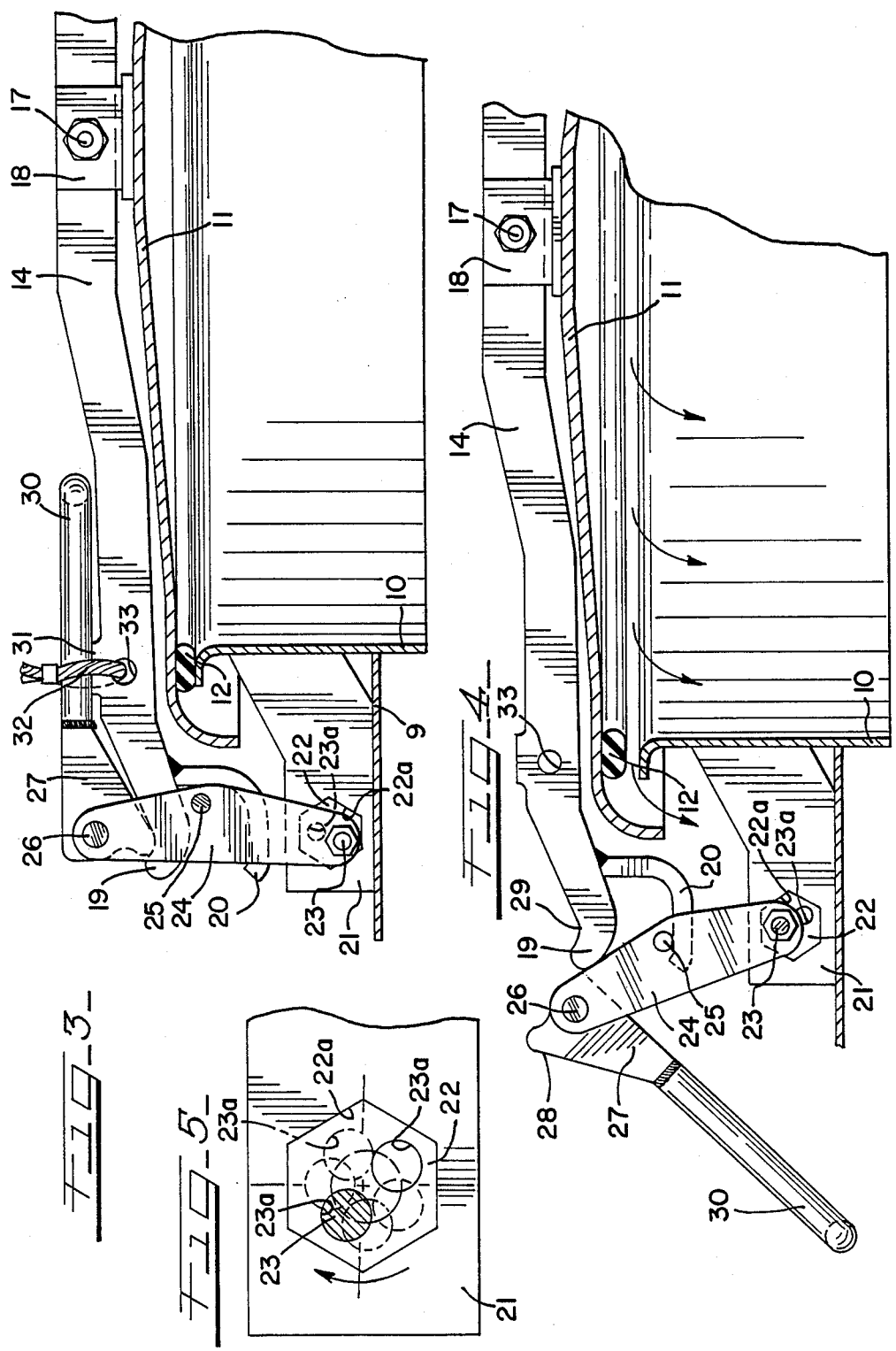

HATCH COVER AND LOCKING STRUCTURE

BACKGROUND OF THE INVENTION

1. Field of the Invention

This invention relates to hatch covers for cargo carrying vessels such as the hopper of a railway covered hopper car.

2. Description of the Prior Art

Locking arrangements for lockingly sealing a hatch cover to a hatch opening or coaming of a vessel such as a lading hopper of a railway covered hopper car are old and well known. The lading in a given vessel may have properties such that excess pressure builds up inside the vessel. When the locking arrangement is released, the excess pressure may swing the hatch cover open with considerable force, endangering human operators and potentially damaging the apparatus. To prevent this, the locking arrangement may be designed to retain the hatch cover in an intermediate "blow-off" position where the hatch cover is free to move enough to vent pressure but restrained against larger movement.

U.S. Pat. Nos. 4,157,146, 4,388,873, and 4,441,431 show various arrangements for sealing a hatch cover and retaining it in a blow-off position. U.S. Pat. No. 4,157,146 discloses a plurality of clamps mounted about the hatch circumference, requiring a plurality of repeated operator functions to open the hatch. U.S. Pat. Nos. 4,388,873 and 4,441,431 disclose a hatch cover securable by a single cam lock in both sealed and blow-off positions, but the latch structure is relatively weak and in the event of mechanical failure, the hatch cover might blow open.

SUMMARY OF THE INVENTION

It is an object of this invention to provide a hatch cover lock which is selectively engageable with a hatch cover in three positions: the first being a tightly sealed position, the second an unsealed intermediate or pressure blow-off position, and the third being the fully disengaged or wide open position.

A hatch cover locking bar having two vertically spaced catches at the locking end co-acts with a latching member having two latch means. The first latch means is a rotatable, pivotally-mounted cam lock member engageable with the upper catch to cause the cover to be in the tightly sealed position with respect to the hatch. The second latch means is a horizontal bar member engageable with the lower catch to retain the cover in the unsealed or pressure blow-off position. Both latch means may be withdrawn from the catches, thereby allowing the hatch cover to be pivotally removed from the hatch and into a disengaged fully unlatched position. A rotative pressure adjustment structure of the locking member is provided to enable selective control of the sealing pressure of the hatch cover on the hatch.

BRIEF DESCRIPTION OF THE DRAWINGS

FIG. 1 is a top plan view of a hatch cover having the locking structure of this invention.

FIG. 2 is a full section view of FIG. 1 as indicated by the section line 2—2, showing the latch arrangement completely disengaged from the hatch cover.

FIG. 3 is an enlarged detailed view showing the hatch cover lock in the locked and sealed position.

FIG. 4 is an enlarged detailed view showing the hatch cover lock in the unsealed or blow-off position.

FIG. 5 is an enlarged detailed view of the adjustment means for the latch, showing several adjustment positions.

DETAILED DESCRIPTION OF THE PREFERRED EMBODIMENT

As best shown in FIG. 2, a railway hopper car has an upper deck surface 9. A hatch ring or annular coaming 10 extends vertically upward from this surface providing a hatch opening in the deck surface. This opening is closed by a hatch cover 11. A seal is maintained by a hatch cover gasket 12 held between hatch cover 11 and coaming 10.

In order to rotate the hatch cover 11 away from the coaming 10, a hinged deck bracket 13 is attached to coaming 10. A hatch cover locking bar or lever 14 is pivotally attached to the hinged bracket 13 by a hatch cover bolt 15. The hatch cover locking bar 14 is equipped with a cover abutment surface indicated at 16 which abuts the top deck surface 9 of the hopper car when the hatch cover 11 is in a wide open position. Hatch cover 11 is attached to hatch cover locking bar 14 at the hatch cover's approximate center point where a pair of center mount flanges 18 extend upward from the hatch cover 11. The hatch cover locking bar 14 is pivotally connected to the center mount flanges 18 by a center mount bolt 17.

At the distal end of the hatch cover locking bar 14 are two hatch cover catches, or latch engagement portions, an upper hatch cover catch 19 and a lower hatch cover catch 20.

A latch structure 14a is located at the opposite side of the coaming 10 from the hinge deck bracket 13, where a latch mounting bracket 21 is affixed to the coaming 10. As best shown in FIG. 5, a die or locator 22 having a hexagonal cross-section passes through a matching hexagonal cross-section bore or aperture 22a in bracket 21 and the latch plate pivot 23 passes through one of the eccentric bores or receiving means 23a in the hexagonal die 22 forming an arrangement which allows adjustment of the height of the pivot 23. The pivot 23 pivotally mounts the link means or latch plates 24 to the latch mounting bracket 21.

A lower latch bar 25 (See FIG. 1) extends between the two latch plates 24 at a point roughly midway along the length of the latch plates 24. As best shown in FIG. 4, at the further end of the latch plates 24 a cam lock member pivot 26 pivotally connects a cam lock member 27 to the latch plates 24. The cam lock member 27 has a cam lock member engaging surface 28 which engages the upper hatch cover catch 19 at the catch engaging surface 29.

To facilitate manual contact by the operator, the cam lock member 27 has a handle 30. When the cam lock member is rotated to the position for tightly sealing the hatch cover, the handle 30 abuts a spacer stop 31 on the locking bar 14 which maintains a space between the cam lock member handle 30 and the main portion of the locking bar 14 (See FIG. 3).

For pilferage prevention, as best shown in FIG. 4, a security seal 32 may be engaged with the cam lock member 27 and the hatch cover locking bar 14. The security seal 32 passes through the security seal bore 33 in hatch cover locking bar 14.

DESCRIPTION OF OPERATION

The position of the hatch cover 11 relative to the coaming 10 may essentially be one of three positions: (1)

tightly closed, (2) partially open in a pressure blow-off position, or (3) wide open.

To place the hatch cover 11 in a tightly closed position as shown in FIG. 3, the hatch cover 11 is allowed to rest against the upper end of coaming 10. The latch plates assembly 24 is then rotated about pivot 23 to allow cam lock member 27 to engage upper hatch cover catch 19. The cam lock member engaging surface 28 engages the catch engaging surface 29 and the cam lock member 27 is rotated until the handle 30 abuts the spacer stop 31. This rotation causes a camming interaction of the cam lock member 27 and the upper hatch cover catch 19, which results in a downward force being applied on the hatch cover locking bar 14 and transmitted to the hatch cover 11 via the center mount flanges 18.

Frequently the lading in a hopper car is of a nature to impose an upward or unsealing gas pressure on the underside of the hatch cover 11. These forces may be of sufficient magnitude to cause a hatch cover to be forced to swing completely open when an ordinary locking mechanism is unlatched. Consequently, it is desirable to restrict such movement. To that end, in this invention there is a secondary release position, or pressure blow-off position, for the latching arrangement. To remove the hatch cover 11 when it is sealed, the cam lock member 27 is rotated away from the spacer stop 31, disengaging the cam lock member engaging surface 28 from the catch engaging surface 29. Any pressure directed upward below the hatch cover 11 will cause the hatch cover 11 to rise and, as a consequence, cause the hatch cover locking bar 14 to rotate about the hatch cover bolt 15. This rotation will continue up to the point where the lower hatch cover catch 20 will meet lower latch bar 25. At this point, the hatch cover will be restrained from further upward movement but adequate space will be present between the hatch cover 11, the sealing gasket 12, and the top of the coaming 10 to allow pressure present in the hopper car to dissipate. Once this pressure has dissipated, the hatch cover 11 will settle to rest against the coaming 10 and the latch plates 24 may be pivoted so as to disengage the lower latch bar 25 from the lower hatch cover catch 20. The cover 11 and the hatch cover locking bar 14 will then be free to pivot into the wide open position.

To reach the wide open position, the hatch cover 11 is pivoted about hatch cover hinge pivot 15 to uncover completely the opening into the hopper car. When the cover 11 is pivoted in this fashion, at the furthest range of its movement the cover abutment surface 16 on the hatch cover locking bar 14 will abut the deck surface of the hopper car 9 supporting the cover 11 in its widest open position.

It is possible to adjust the downward pressure imposed by the latch structure 14a on the hatch cover locking bar 14. As best shown in FIG. 5, the hexagonal die 22 is equipped with eccentric bores 23a which are sized to accomodate the latch plate pivot 23. When the latch plate pivot 23 is removed from the die 22, the die 22 may be removed from its matching hexagonal bore 22a in latch mounting bracket 21. After removal of the die from the bore 22a, the die 22 may be rotated to one of a plurality of positions wherein the die 22 fits into the hexagonal bore 22a and reinserted, altering the vertical height of the bores 23a in the die 22. The latch plate pivot 23 may then be reinserted in the bore 23a in the die 22 having the vertical height desired. The adjustment in the vertical location of the latch plate pivot 23 adjusts the vertical location of the cam lock member 27 when in the lock position and, as a consequence, alters the pressure applied via hatch cover locking bar 14 to the hatch cover 11.

When the latch arrangement 14a is in the tightly sealed position, as shown in FIG. 3, it is possible to lock the latch mechanism by passing a suitable lock through the security seal bore 33 which will restrain the cam lock member handle 30 from being moved to release the hatch cover 11. Also a tamper-indicating seal 32 may be used to connect the cam lock member handle 30 to the hatch cover locking bar 14 by running security seal 32 through the security seal bore 33 and securing it around the handle 30.

While the present invention has been described with reference to a particular embodiment, it is not intended to illustrate or describe herein all of the equivalent forms or ramifications thereof. The words used are words of description rather than limitation, and various changes may be made without departing from the scope or spirit of the invention disclosed herein.

What is claimed is:

1. In a hatch cover assembly for a lading container having an upper deck surface defining a hatch opening and a hatch cover adapted to cover the hatch opening and pivotally associated with the hatch opening so that the hatch cover is pivotable toward and away from the hatch opening, a latch arrangement comprising:
   a latch engagement structure operatively associated with the hatch cover comprising
   a first latch engagement portion, and
   a second latch engagement portion spaced from the first latch engagement portion,
   the first and second latch engagement portions defining a space therebetween; and
   a latch structure associated with the upper deck surface and adapted to engage with the latch engagement structure for retaining the hatch cover in a locked position, the latch structure comprising
   a link means associated with the upper deck surface, and
   first and second latch members connected with the link means,
   the first latch member being adapted to engage the first latch engagement portion for sealingly engaging the hatch cover over the hatch opening,
   the second latch member being adapted to enter into the space between the first and second latch engagement portions when the first latch member is engaged with the first latch engagement portion,
   the second latch member being engageable with the second latch engagement portion for retaining the hatch cover spaced from the hatch opening in position relatively further from the hatch opening than that taken during sealing engagement, whereby excess pressure in the container may dissipate.

2. The invention according to claim 1, and
the first latch member including a camming surface adapted to engage the first latch engagement portion for sealingly engaging the hatch cover over the hatch opening.

3. The invention according to claim 2, and
the first latch member being rotatably connected with the link means.

4. The invention according to claim 3, and
the first latch member including a handle means for rotating same and for facilitating operator use of the latching structure.

5. The invention according to claim 4, and
the handle means being adapted to abut the locking member when the camming surface engages the first latch engagement portion and sealingly engages the hatch cover over the hatch opening, and
the locking member having a security bore therein below the handle means during abutment of the handle means against the locking member, and
security means adapted to extend through the security bore and to entrap the handle means, whereby rotation of the handle means to open the hatch cover will require removal of the security means.

6. The invention according to claim 1, and
the second latch member comprising a bar member engageable with the second latch engagement portion for retaining the hatch cover in limited movement.

7. The invention according to claim 6, and
the link means comprising a pair of plate members, and the second latch member being supported between the pair of plate members.

8. The invention according to claim 1, and
a mounting member being attached to the upper deck surface, and
a pivot means rotatably connecting the link means with the mounting member.

9. The invention according to claim 8, and
the mounting member having a locator receiver aperture therein and
a locator means adapted to be inserted into the locator receiver aperture in a plurality of rotated positions,
the locator means having eccentric pivot receiving means therein,
each of the pivot receiving means being located at a different distance from the outside edge of the locator means, whereby the spatial relationship of the pivot means may be adjusted by removal of the locator means from the locator receiver aperture, rotation of the locator means, reinsertion of the locator means in the locator receiver aperture and the selective placement of the pivot means in one of the eccentric pivot receiving means.

10. The invention according to claim 9, and
the locator means and the locator reciver aperture being hexagonal in cross section.

11. The invention according to claim 8, and
the mounting member having a die bore therein and a die means adapted to be inserted into the die bore in a plurality of rotated positions,
the die means having eccentric pivot bores therein,
each of the pivot bores being located at a different distance from the outside edge of the die, whereby the vertical height of the pivot may be adjusted by removal of the die means from the die bore, rotation of the die means, reinsertion of the die means in the die bore, and the selective placement of the pivot means in one of the eccentric pivot bores.

12. The invention according to claim 1, and
the locking member having an abutment surface adapted to abut the upper deck surface thereby supporting the hatch cover when the hatch cover is fully withdrawn from the hatch opening and placed in a wide open position.

13. A railroad vehicle comprising:
an enclosed container for holding a commodity, the container having an opening in its upper surface for loading the commodity,
a generally annular coaming surrounding the opening and extending upwardly beyond the upper surface of the container,
a cover having an underside above the coaming for closing the opening,
an annular gasket sealing the underside of the cover against the upper end of the coaming,
an elongated locking lever connected with the top of the cover, opposite ends of the locking lever projecting beyond the periphery of the cover,
a hinge connecting one end of the locking lever to the coaming so that the cover is pivotable toward and away from the coaming to close and open the container,
the locking lever having first and second latch engagement portions on the end of the locking lever distal to the hinge,
the first latch engagement portion being located away from the second latch engagement portion and defining with the second latch engagement portion a space between the first and second latch engagement portions,
a latch structure for holding the cover in closed position against the coaming, comprising
link means pivotally associated with the coaming,
first and second latch members connected with the link means,
the first latch member being adapted to engage the first latch engagement portion for sealingly closing the hatch cover over the coaming,
the second latch member being adapted to enter into the space between the first and second latch engagement portions when the first latch member is engaged with the first latch engagement portion,
the second latch member being engageable with the second latch engagement portion when the first latch member is disengaged from the first latch engagement portion thereby retaining the locking lever and the hatch cover away from the coaming in a position relatively further than that taken during sealing engagement and allowing the cover sufficient movement for excess pressure inside the container to escape between the cover and the coaming.

14. The invention according to claim 13, and
the first latch member including a camming surface adapted to engage the first latch engagement portion and to cammingly press downward on the first latch engagement portion and the locking lever, thereby sealingly closing the hatch cover over the coaming.

15. The invention according to claim 14, and
the first latch member being rotatably connected with the link means.

16. The invention according to claim 15, and
the first latch member having a handle for manual operation of the latch structure.

17. The invention according to claim 13, and
the second latch member comprising a bar means engageable with the second latch engagement portion.

18. A hatch cover assembly comprising:
a hatch cover adapted to cover and seal an opening in the upper surface of a container,
a locking lever connected with the top of the hatch cover and extending beyond the periphery of the hatch cover, a hinge operatively connecting one end of the locking lever with the upper surface of the container, so that the cover is pivotable toward and away from the opening to close and open the container, the locking lever having first and second latch engagement portions on the end of the locking lever distal to the hinge, the first latch engagement portion being located above the second latch engagement portion and defining with the second latch engagement portion a space between the first and second latch engagement portions, a latch structure for holding the cover in closed position, comprising link means pivotally connected with a mounting bracket fixed on the upper surface of the container, a first latch member pivotally connected to the link means, said first latch member comprising a camming surface adapted to cammingly engage the first latch engagement portion for sealingly closing the hatch cover and a handle for manual operation of the latch structure, and a second latch member being adapted to enter into the space between the first and second latch engagement portions when the first latch member is engaged with the first latch engagement portion, the second latch member being engageable with the second latch engagement portion when the first latch member is disengaged from the first latch engagement portion thereby retaining the locking lever and the hatch cover away from the opening in a position relatively further than that taken during sealing closure of the hatch cover and allowing excess pressure in the container to escape.

* * * * *